US008822552B2

(12) United States Patent
Hatanaka et al.

(10) Patent No.: US 8,822,552 B2
(45) Date of Patent: Sep. 2, 2014

(54) SPRAY CAN PRODUCT AND METHOD OF MANUFACTURING SPRAY CAN PRODUCT

(75) Inventors: Toshifumi Hatanaka, Himeji (JP); Masaki Okada, Fuji (JP); Kiyotaka Miyata, Fuji (JP); Teruo Miura, Fuji (JP)

(73) Assignees: NKK Co., Ltd., Himeji-shi (JP); Showa Denko Gas Products Co., Ltd., Kanagawa (JP); Japan Petroleum Exploration Co., Ltd., Tokyo (JP)

( * ) Notice: Subject to any disclaimer, the term of this patent is extended or adjusted under 35 U.S.C. 154(b) by 583 days.

(21) Appl. No.: 13/127,324

(22) PCT Filed: Nov. 2, 2009

(86) PCT No.: PCT/JP2009/068764
§ 371 (c)(1), (2), (4) Date: May 3, 2011

(87) PCT Pub. No.: WO2010/053069
PCT Pub. Date: May 14, 2010

(65) Prior Publication Data
US 2011/0218096 A1 Sep. 8, 2011

(30) Foreign Application Priority Data
Nov. 4, 2008 (JP) ................................ 2008-283288

(51) Int. Cl.

| | |
|---|---|
| ***C09K 3/30*** | (2006.01) |
| ***F23D 14/28*** | (2006.01) |
| ***F17C 11/00*** | (2006.01) |
| *B65B 31/00* | (2006.01) |

(52) U.S. Cl.
CPC ................ *F17C 11/00* (2013.01); *F23D 14/28* (2013.01); *B65B 31/003* (2013.01)
USPC ................. 516/8; 516/8.1; 206/0.7; 206/204; 141/3; 141/20; 222/3; 222/4; 222/394; 222/635

(58) Field of Classification Search
USPC ............... 516/8, 8.1; 206/0.7, 204; 141/3, 20; 222/3, 4, 394, 635
See application file for complete search history.

(56) References Cited

U.S. PATENT DOCUMENTS 4,182,688 A * 1/1980 Murtaugh ..................... 252/372
4,431,120 A * 2/1984 Burger .............................. 516/8
(Continued)

FOREIGN PATENT DOCUMENTS

DE 2039370 A1 10/1972
FR 1603001 A5 4/1971
(Continued)

OTHER PUBLICATIONS

Derwent Abstract on EAST, week 201013, London: Derwent Publications Ltd., AN 2005-574442, JP 2005206723 A, (Sekiyu Shigen Kaihatsu KK), abstract, pp. 1-3.*

(Continued)

*Primary Examiner* — Daniel S Metzmaier
(74) *Attorney, Agent, or Firm* — Posz Law Group, PLC

(57) ABSTRACT

A spray can product capable of preventing leakage where used or stored in a tilted or an inverted position, and keeping good safety and liquid retention even where a flammable liquefied gas is used. The spray can product is formed by filling a spray can having an ejection opening with a liquefied gas and an absorbing body for retaining liquid, and the absorbing body is composed of an assembly of cellulose fibers containing at least 45 mass % of fine cellulose fibers having a fiber length of 0.35 mm or less. The absorbing body compressed into a block-shaped configuration corresponding to that of the spray can is accommodated within the spray can while defining a space on the side of an ejection opening, and a lid-like member is provided between the space and the absorbing body to protect a surface of the absorbing body in a gas permeable manner.

6 Claims, 5 Drawing Sheets

(56) References Cited

U.S. PATENT DOCUMENTS

| | | | | |
|---|---|---|---|---|
| 4,729,494 | A * | 3/1988 | Peillon et al. | 222/3 |
| 5,544,785 | A * | 8/1996 | Frigiere | 222/3 |
| 6,601,833 | B2 * | 8/2003 | Takai et al. | 261/121.1 |
| 6,622,880 | B1 * | 9/2003 | Di Stasio | 220/88.1 |
| 6,708,844 | B2 * | 3/2004 | Lim et al. | 222/3 |
| 6,932,945 | B2 | 8/2005 | Hertzler | |
| 2008/0257755 | A1 * | 10/2008 | Yoshida | 206/7 |
| 2010/0037628 | A1 | 2/2010 | Hatanaka et al. | |
| 2010/0282621 | A1 * | 11/2010 | Hatanaka et al. | 206/204 |
| 2011/0218096 | A1 * | 9/2011 | Hatanaka et al. | 222/394 |

FOREIGN PATENT DOCUMENTS

| | | | | |
|---|---|---|---|---|
| JP | 57-141000 | A | | 8/1982 |
| JP | 04-202895 | A | * | 7/1992 |
| JP | 09-4797 | A | | 1/1997 |
| JP | 10-52676 | A | | 2/1998 |
| JP | 10-89598 | A | | 4/1998 |
| JP | 04-245792 | A | * | 9/1998 |
| JP | 2005-206723 | A | | 8/2005 |
| JP | 2008-180377 | A | | 8/2008 |

OTHER PUBLICATIONS

Derwent Abstract on EAST, week 199236, London: Derwent Publications Ltd., AN 1992-296009, JP 04202895 A, (Chisso Corp), abstract, pp. 1-2.*

JPO on EAST, Patent Abstracts of Japan, Japan patent Office, Tokyo, Japan, JP 10245792 A (Sep. 1998), Abstract, pp. 1-2.*

Machine Translation of Publ. No. JP 2005206723 A, published Aug. 2005, Japan patent Office, Tokyo, Japan, obtained online @ http://dossier1.ipdl.inpit.go.jp/AIPN/odse_top_dn.ipdl?N0000=7400 (Downloaded Sep. 30, 2012).*

Machine Translation of Publ. No. JP H10245792 A, published Sep. 1998, Japan patent Office, Tokyo, Japan, obtained online @ http://dossier1.ipdl.inpit.go.jp/AIPN/odse_top_dn.ipdl?N0000=7400 (Downloaded Sep. 30, 2012).*

Machine Translation of Publ. No. JP 10-052676 A, published Feb. 1998, Japan patent Office, Tokyo, Japan, obtained online @ http://dossier1.ipdl.inpit.go.jp/AIPN/odse_top_dn.ipdl?N0000=7400 (Downloaded Sep. 30, 2013).*

International Search Report mailed on Jan. 19, 2010 for the corresponding International patent application No. PCT/JP2009/068764 (English translation enclosed).

* cited by examiner

SPRAY CAN PRODUCT AND METHOD OF MANUFACTURING SPRAY CAN PRODUCT

CROSS REFERENCE TO RELATED APPLICATIONS

This application is a U.S. national stage application of PCT/JP2009/068764 filed on Nov. 2, 2009, and claims priority to, and incorporates by reference, Japanese Patent Application No. 2008-283288 filed on Nov. 4, 2008.

TECHNICAL FIELD

The present invention relates to a spray can product manufactured by filling a spray can having an ejection opening with a liquefied gas and a liquid retaining absorbing body and, more particularly, to a spray can product adapted to be preferably used as a dust blower filled with a propellant for removing dust, and a cylinder for use in a torch burner, etc, filled with a flammable gas, and a method of manufacturing the same.

BACKGROUND ART

A product using a spray can, such as a dust blower, for example, is manufactured by filling a metallic spray can having a spray button with a propellant such as a compressed gas or a liquefied gas, etc. and dust attached to various kinds of appliances is removed by blowing off the same with gas sprayed by pushing the spray button. Conventionally, fluorocarbons have been used as the propellant for the spray products inclusive of the dust blowers, but fluorocarbons are substances causing the depletion of the ozone layer, which results in that controls on usage of fluorocarbons become severe. Under these circumstances, a propellant exhibiting a smaller ozone-depleting potential has been developed, and now, alternatives to fluorocarbons, such as HFC 134a ($CH_2F$—$CF_3$) and HFC 152a ($CH_3$—$CHF_2$) have been widely used.

However, HFC 134a is a non-flammable gas so as not to cause burning, but exhibits a global warming potential as high as 1300. HFC 152a ($CH_3$—$CHF_2$) exhibits a global warming potential as small as 140, but is a flammable gas so that it must be handled with care. In addition, these alternatives to fluorocarbons are expensive, and since they are fluorides, they exhibit properties of generating a highly poisonous hydrofluoric acid when contacting an open fire, which causes a serious security problem.

On the other hand, In recent years, protection of the global environment has become of major interest, and, not only the depletion of the ozone layer but also effects of such fluorocarbons on the environmental contamination, in particular, the global warming, which is caused by the emission of components of the propellant into the air, become problems which cannot be by-passed. According to Law on Promoting Green Purchasing (Law Concerning the Promotion of Procurement of Eco-Friendly Goods and Services by the State and Other Entities), products which do not cause a large environmental impact due to emission of green house gas, etc. as a result of the use thereof is defined as the “eco-friendly goods”, and with respect to the dust blower, the “evaluation criteria” thereof has been changed to “Does not use material that would damage the ozone layer, or hydro-fluorocarbon (so-called CFC alternative)” on Apr. 1, 2008.

As a result of this change, products using CFC alternatives become not “eco-friendly goods” which are goods according to Law on Promoting Green Purchasing, and consequently, dimethyl ether (DME) which does not cause the depletion of the ozone layer and exhibits a very small global warming potential, has been noted as the propellant satisfying the changed “evaluation criteria”. But, dimethyl ether (DME) is a flammable gas so as to exhibit problems in safety during using or storing of the products.

And cylinders for use in the torch burners used in various works with flames are normally cartridge-type gas cylinders manufactured by filling spray can-shaped metallic pressure-resistant containers, each having an ejection opening, with fuel such as a flammable gas, a liquefied fuel gas, etc., and the fuel is introduced into a burner attached to the ejection opening to be burnt. The above-described dimethyl ether (DME) and a liquefied petroleum gas (LPG) exhibiting a high calorific value, emitting only a small amount of $CO_2$ in a combustion exhaust gas, as compared with petroleum oil and coal, and causing no depletion of the ozone layer, have been used as the fuel for the torch burner.

The cylinder for a torch burner has a construction similar to that of the dust blower, and uses a flammable gas so that the improvement of the safety is a very important problem. In particular, the spray can product using a liquefied gas, normally has an absorbing body manufactured by filling an interior of a spray can with fibers obtained by pulverizing waste paper, etc. Where the spray can product is used in an inverted position or a tilted position, the liquefied gas may leak from the ejection opening thereof in a liquid phase, and may catch fire.

In order to overcome this problem, the present inventors have proposed in Patent Document 1 to combine dimethyl ether (DME) with carbon dioxide as another component, thereby imparting flame retardant properties to the propellant of the dust blower. Dimethyl ether (DME) is a flammable gas, but both the ozone-depleting potential and the global warming potential are very small, and by mixing carbon dioxide gas thereinto, the safety thereof is improved.

Patent Document 1: Japanese Unexamined Patent Application Publication No. 2005-206723.

And the present inventors have proposed in Patent Document 2 an absorbing body for a spray can, which is composed of a cellulose fiber assembly obtained by pulverizing wood pulp, etc., and contains at least a prescribed amount of fine cellulose fibers having a fiber length of 0.35 mm or less. This absorbing body contains fine fibers obtained by pulverizing cellulose fibers with mechanical or chemical means, and is excellent in absorbing performance and liquid retention.

Patent document 2: Publication of unexamined Patent Application No. 2008-180377

As is disclosed in Patent document 3 through Patent document 5, a porous synthetic resin foam is known as another absorbing body. For example, in Patent documents 3 and 4, urethane resin foam is used, and a raw material is poured in an interior of a spray can and is foamed therein to make the filling process simple. And in Patent document 5, phenol resin foam is used, and after the phenol resin foam is molded to conform to the shape of a spray can, and it is pushed therein.

Patent document 3: JP Patent No. 2824241

Patent document 4: Publication of unexamined Patent Application No. Hei10-89598

Patent document 5: Publication of unexamined Patent Application No. Hei09-4797

DISCLOSURE OF THE INVENTION

Problem to be Solved with the Invention

The method disclosed in Patent document 1 cannot be applied to a cylinder for a torch burner. And where this method is applied to the propellant of the dust blower, in order to impart flame retardant properties by merely adding carbon dioxide, the weight ratio of carbon dioxide must be comparatively increased, whereby the pressure resistant strength of the spray can is required to increase. This is caused by that the dust blower is normally used in a tilted position or an inverted position, and is sprayed continuously for blowing the dust off. Where the weight ratio of carbon dioxide is small, it becomes difficult to continue spraying in a completely vaporized state. And it is not easy to mix carbon dioxide into dimethyl ether (DME) with a high weight ratio, and maintain a homogeneously mixed state within a spray can, and consequently, carbon dioxide first escapes to make the quality of products instable and to damage feeling upon using.

The absorbing body disclosed in Patent document 2 contains a large amount of finely powdered fine cellulose fibers so as to readily contain air in the process of disintegrating and pulverizing a raw pulp, whereby it is not easy to handle the absorbing body. Therefore, with the conventional method, it has been difficult to fill a spray can with a required weight of the absorbing body so that, practically, there has been adopted the method of piling fine fibers obtained by wet method on a sheet and winding the same to conform to the shape of the spray can, or the method of adding a binder to such fine fibers to combining them to each other, and molding to conform to the shape of the spray can, whereby the manufacturing process may be complex. In addition, where the binder is added, there have occurred the problems that the production costs increase, and the absorbing properties lower when the fibers are covered with the binder. There is another method of piling fine fibers collected with a dust collector, and packing them into a bag composed of a non-woven fabric, but the packing work and sealing work are troublesome, whereby the workability and the productivity are not good.

With the absorbing body composed of the porous synthetic resin foam, which is used in Patent documents 3 through 5, it takes a long time to foam and mold the same, and the resin as a raw material is expensive, thereby increasing production costs. The porous synthetic resin foam is excellent in liquid retention, but has the problem that a residual gas may stay within a spray can so that it cannot be used completely.

Under these circumstances, the present invention has an object of providing a spray can product excellent in workability, productivity and economic efficiency, which is capable of preventing occurrence of liquid leakage when used or stored in a tilted or an inverted position, ensuring safety and liquid retention even where a flammable liquefied gas is used, and reducing costs without using expensive raw materials and complex manufacturing processes, and a method of manufacturing such a spray can product.

Means for Solving Problem

In order to solve the above-described problems, the present invention has arrangements, as follows.

A first aspect of the present invention is a spray can product wherein a liquefied gas and an absorbing body for retaining liquid are filled in a spray can having an ejection opening, and is characterized in that the absorbing body is composed of an assembly of cellulose fibers containing at least 90 mass % of cellulose fibers having a fiber length of 1.5 mm or less, the absorbing body compressed into a block-like configuration corresponding to that of the spray can is accommodated in the spray can with a space left on the side of the ejection opening, and a lid-like member is provided between the space and the absorbing body so as to protect a surface of the absorbing body in a gas permeable manner.

In accordance with the present invention, the absorbing body compressed into a block-like configuration and the lid-like member provided on the upper surface thereof prevent the generation of liquid leakage where used or stored in a tilted position or an inverted position. At this time, the upper side of the absorbing body directly filled in the spray can is sealed with the lid-like member so that finely powdered cellulose fibers do not scatter when the liquefied gas is filled therein, or sprayed, and consequently, safety and liquid retention can be ensured where a flammable liquefied gas is used. In addition, production costs can be reduced without using expensive raw materials and complex manufacturing steps and consequently, the spray can product excellent in workability, productivity and economy efficiency can be obtained.

In a second aspect of the present invention, the lid-like member is composed of a disk-shaped porous body adapted to be press-fitted in the spray can into close contact with the surface of the absorbing body.

The lid-like member is positioned within the spray can in close contact with the absorbing body to provide a seal against the space so that the displacement of the absorbing body is limited to ensure the provision of the space, whereby the scattering of the fine cellulose fibers can be securely prevented.

In a third aspect of the present invention, the lid-like member is composed of a porous protection layer integrally formed on the surface of the absorbing body.

By forming the lid-like member integrally with the absorbing body, the configuration of the absorbing body is securely held and a seal is securely provided, whereby the provision of the space can be ensured within the spray can, and the scattering of the fine cellulose fibers can be securely prevented.

In a fourth aspect of the present invention, the disk-shaped porous body or the porous protection layer as the lid-like member is composed of a foam resin or a non-woven fabric.

The lid-like member can be composed using the foam resin or non-woven fabric that are porous and permeable materials.

In a fifth aspect of the present invention, the absorbing body is prepared by previously forming an assembly of cellulose fibers into a columnar block-shaped compressed body with a shape corresponding to that of the spray can, and directly filling the columnar block-shaped compressed body in the spray can.

By previously forming the assembly of cellulose fibers into a can-shaped compressed body, it becomes easy to directly fill into the spray can, whereby the manufacturing processes can be facilitated.

In a sixth aspect of the present invention, the liquefied gas is a flammable liquefied gas.

The present invention is particularly effective against the product in which a flammable liquefied gas is filled, and can prevent the occurrence of liquid leakage and greatly improve the safety.

In a seventh aspect of the present invention, the liquefied gas is composed of a gas exhibiting an ozone-depleting potential of 0, and containing no hydro-fluorocarbon.

By composing the liquefied gas of a gas that does not deplete the ozone layer nor contain hydro-fluorocarbon, the environmental impact can be reduced to a minimum.

In an eighth aspect of the present invention, the absorbing body is composed of an assembly of cellulose fibers containing at least 45 mass % of fine cellulose fibers having a fiber length of 0.35 mm or less.

In a preferred embodiment, where the assembly of cellulose fibers as the absorbing body contains at least a prescribed amount of fine cellulose fibers with a shorter fiber length, the liquid retention performance is further improved.

A ninth aspect of the present invention is a method of manufacturing a spray can product wherein a liquefied gas and an absorbing body for retaining liquid are filled in a spray can having an ejection opening, which can be preferably used to manufacture the spray can product thus arranged.

The method is characterized by the steps of pulverizing raw fibers mechanically to prepare an assembly of cellulose fibers containing at least 90 mass % of cellulose fibers having a fiber length of 1.5 mm or less, after weighing a prescribed amount of the assembly of cellulose fibers, previously compressing the weighed assembly of cellulose fibers in radial directions of the spray can to prepare a block-shaped compressed body as the absorbing body with a configuration generally corresponding to that of the spray can, and after pushing the absorbing body into the spray can from an upper opening of the spray can, press-fitting a disk-shaped porous body into close contact with an upper side of the absorbing body, or forming a porous protection layer integrally with an upper surface of the absorbing body to form a lid-like member while defining a space on an upper side thereof.

With the above-described method, even where a large amount of finely powdered fine cellulose fibers is contained, a product wherein the absorbing body is directly filled in the spray can be manufactured in a simple manufacturing process with good workability by previously compressing the absorbing body in the radial directions to form a block-shaped compressed body with a configuration identical to that of the spray can, filling the block-shaped compressed body into the spray can, and disposing the lid-like member. At this time, by previously compressing the absorbing body in the radial directions, the directly filled absorbing body is uniformly held within the spray can, whereby the liquid retention performance is improved, and by providing a seal with the lid-like member, the scattering of the absorbing body is prevented, whereby the spray can product with a high quality can be obtained.

A tenth aspect of the present invention is a method of manufacturing a spray can product wherein a liquefied gas and an absorbing body for retaining liquid are filled in a spray can having an ejection opening, which includes the steps of pulverizing raw fibers mechanically to prepare an assembly of cellulose fibers containing at least 90 mass % of cellulose fibers having a fiber length of 1.5 mm or less, after weighing a prescribed amount of the assembly of cellulose fibers, previously compressing the weighed assembly of cellulose fibers in radial directions of the spray can to prepare a block-shaped compressed body as the absorbing body with a configuration generally corresponding to that of the spray can, and after press-fitting a lid-like member composed of a disk-shaped porous body into the spray can from a bottom opening of the spray can, pushing the absorbing body into the bottom opening into close contact with the lid-like member while defining a space on an upper side of the lid-like member With the above-described method, a spray can product can be also manufactured in a simple manufacturing process with good workability by previously compressing an assembly of cellulose fibers, which contains finely powdered minute cellulose fibers, to form a block-shaped compressed body with a configuration generally identical to that of the spray can, and filling the block-shaped compressed body into the spray can in which the lid-like member is disposed. In addition, by previously compressing the absorbing body in the radial directions of the spray can, the absorbing body is uniformly held within the spray can, whereby the liquid retention performance is improved, and by providing a seal with a lid-like member, the scattering of the absorbing body is prevented, whereby the spray can product with a high quality can be obtained.

BEST MODE FOR CARRYING OUT THE INVENTION

Hereinafter, the spray can product and the manufacturing method thereof in accordance with the present invention will be explained based on embodiments. The spray can product in accordance with the present invention can be favorably used as any spray can product having a spray can provided with an ejection opening, which is filled with a liquefied gas and an absorbing body for retaining the same. Examples thereof include dust blowers for removing dust and cylinders for torch burners, for example.

Figure 1:
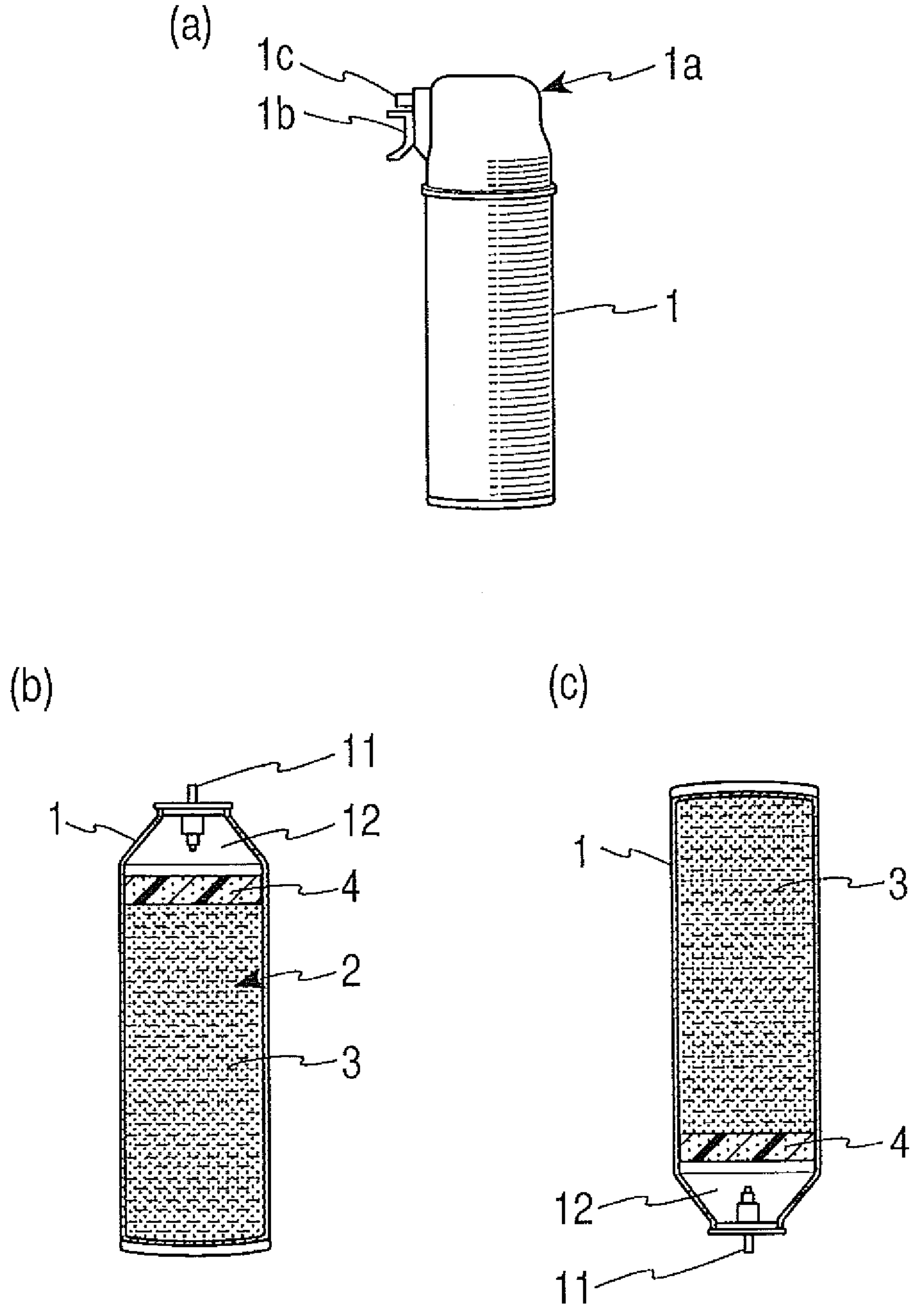
FIG. 1 shows one example of the arrangement of a dust blower to which the present invention is applied, and (a), (b) and (c) are respectively a side view, a longitudinal sectional view in an upright position, and a longitudinal sectional view in an inverted position of the dust blower.

Hereinafter, a dust blower to which the present invention is applied as a representative example will be explained with reference to accompanying drawings. FIG. 1(*a*) is a view schematically showing an overall arrangement of the dust blower, and an ejection member 1*a* having an ejection lever 1*b* is secured to a head of a spray can 1. In FIGS. 1(*b*) and 1(*c*), an absorbing body 2 for retaining liquid is accommodated within the spray can 1, and the absorbing body 2 absorbs and retains a propellant 3 as a liquefied gas. The spray can 1 made of metal has a trunk section with a constant diameter, a head section with a tapered configuration enlarging downwardly, and an ejection opening 11 at a center of a top of the head section. The ejection opening 11 has a valve-like construction that opens by pushing the ejection lever 1*b*.

The absorbing body 2 is compressed into a columnar block with an approximately identical diameter to the inside diameter of the spray can 1, and is contained in the spray can 1 downwardly of the trunk section with a constant diameter while leaving a space 12 on the side of the head section. The liquefied gas 3 as a propellant is accommodated in an interior of the spray can 1 while being retained with the pulverized cellulose fibers composing the absorbing body 2 along with gaps between fibers, and by pushing the ejection lever 1*b*, the ejection opening 11 is opened, thereby discharging a spray gas from an ejection nozzle 1*c* to remove dust and dirt.

A lid-like member 4 is provided in the vicinity of an upper end of the trunk section of the spray can 1 so as to separate the space 12 from the absorbing body 2. The absorbing body 2 is directly filled without being covered with any sheet, bag, etc. as a skin layer thereof, and the lid-like member 4 covers a surface of the absorbing body 2 compressed in close contact with an upper surface thereof. As a result, the lid-like member 4 can protect the surface of the absorbing body 2 in a gas permeable manner, and limits the displacement of the absorbing body 2 to prevent scattering of the minute cellulose fibers on the surface thereof.

In accordance with the present invention, the absorbing body 2 is composed of a cellulose fiber assembly containing at least 90 mass % of cellulose fibers having a fiber length of 1.5 mm or less. By determining the fiber length of the cellulose fibers to be 1.5 mm or less, and filling an interior of the spray can with a fiber assembly pressurized and compressed, closely, the absorbing body 2 can absorb and retain a required amount of a liquefied gas, whereby the liquid retention can be enhanced, and the safety can be improved. It is preferable that the cellulose fiber assembly contains at least 80 mass % of cellulose fibers having a fiber length of 1.0 mm or less. This assembly is more effective. In particular, where at least 45 mass % of minute cellulose fibers having a fiber length of 0.35 mm or less are contained, the absorbing performance and liquid retention of the liquefied gas are improved so that the liquid leakage prevention effect can be sufficiently achieved where the spray can 1 is used or stored in a tilted or inverted position, which is more preferable.

In accordance with the present invention, the term "fiber length" refers to the average fiber length measured with the fiber length analyzer FS-200 (Kajaani Process Measurements Ltd.).

The absorbing body 2 mainly contains minute cellulose fibers having a fiber length of 0.35 mm or less, which are manufactured by disintegrating and pulverizing a raw material containing cellulose fibers. The cellulose fibers are pulverized with mechanical and/or chemical means, and it is preferable to pulverize the cellulose fibers with the mechanical means, and classify the same. With this method, a cellulose fiber assembly containing a predetermined amount of minute cellulose fibers with a desired fiber length can be obtained with a simple process.

Examples of the cellulose fibers as a raw material of the absorbing body 2 include any cellulose fibers such as bleached or unbleached softwood or hardwood chemical pulp, a dissolving pulp, a waste paper pulp, cotton, etc. A plurality of cellulose fibers raw materials can be used in combination. By pulverizing these raw materials to obtain fibers having a predetermined fiber length, they can be used as the absorbing body in accordance with the present invention. A bleached softwood kraft pulp (NBKP) and a bleached hardwood kraft pulp (LBKP) are excellent, because they exhibit good absorbing properties and good liquid retention, and do not cause any coloring of a liquefied gas, so as to be preferably used.

Waste paper pulp has advantages such as low costs, a small environmental impact, etc. The waste paper pulp has been known to exhibit less inferior liquid retention of fibers so as to have the problem that a printing ink is attached to the fibers thereof, for example. Where the absorbing body 2 is arranged by mainly using a large amount of cellulose fibers with a fiber length of 1.5 mm or less, preferably 1.0 mm or less, in particular, minute cellulose fibers with a fiber length of 0.35 mm or less, compressing such cellulose fibers, and directly filling a spray can 1 therewith, it has been proved that a sufficient liquid retention can be obtained. This is presumed that by directly filling the spray can 1 with the absorbing body 2, the minute cellulose fibers disperse homogeneously within the spray can 1, and consequently, a liquefied gas is homogeneously retained with an overall absorbing body 2, thereby enhancing the liquid retention. Where the damage of the waste paper pulp is great, it is desirable to obtain a desired liquid retention by increasing the content or the filling amount of the minute cellulose fibers having a fiber length of 0.35 mm or less, or using with other raw material pulps without using solely.

In order to mechanically pulverize cellulose fibers as a raw material, a high-speed impact pulverization method such as a rotary mill, a jet mill, etc., a roll crusher method, etc. have been mainly used. The cellulose fibers can be previously pulverized roughly with a shear crushing method using a shredder, etc. In addition, fibers obtained as a by-product during the manufacturing of other fiber products can be also used. For example, cellulose fibers recovered from a bag filter upon manufacturing a pulp air laid non-woven fabric contain a large amount of minute cellulose fibers so that they may be solely used as a raw material or mixed with other cellulose fibers to compose a desired cellulose fiber assembly. As a result, the manufacturing process can be made simple so as to be preferable.

The processing conditions of the pulverizing machine can be arbitrarily selected according to desired physical properties of the minute cellulose fibers. In addition, any one of the batch method and the continuous method may be used as the processing method, and there can be used the method in which several devices are connected in series to pulverize the cellulose fibers rough in a first stage, and then, pulverize them fine in the following stages. And the cellulose fibers previously pulverized using the mechanical means can be subjected to classification to contain at least 90 mass % of cellulose fibers having a fiber length of 1.5 mm or less, preferably, at least 80 mass % of cellulose fibers having a fiber length of 1.0 mm or less and more preferably, at least 45 mass % of minute cellulose fibers having a fiber length of 0.35 mm or less. Alternatively, by preparing cellulose fibers having a fiber length of 1.5 mm or less, preferably 1.0 mm or less, or minute cellulose fibers having a fiber length of 0.35 mm or less with classification, and mixing them with other cellulose fibers to have a desired mass %, a resultant mixture is preferably used.

Cellulose is an organic substance and soft so that it may be difficult to obtain minute cellulose particles with only the mechanical pulverization process, and in such a case, in order to obtain minute cellulose fibers, a combination method of the chemical processing and the mechanical pulverization can be used. Cellulose is generally composed of a crystalline region and a non-crystalline region, and the non-crystalline region exhibits readily reactive properties on chemicals. It is known from these facts that by reacting cellulose on mineral acids, as the chemical processing, the non-crystalline region is made to liquate out, and consequently, cellulose fibers mainly composed of a crystalline part are obtained. And by further processing the cellulose fibers mainly composed of the crystalline part mechanically, minute cellulose particles can be obtained.

And, the pulverization processing can be also performed with a media-stirring type wet pulverizer. The media-stirring type wet pulverizer is the device by which media and cellulose fibers filled in a stationary pulverization container are stirred by rotating a stirring machine inserted in the pulverization container at a high speed, thereby generating a shear stress to pulverize the cellulose fibers therewith. There are a tower-type, a tank-type, a feed tube-type, a manular-type, etc. Any device of these types can be used provided that a media-stirring mechanism is adopted. In particular, a sand grinder, an ultra visco mill, a dyno mill, and a diamond fine mill are preferable.

By processing such a pulp with the above-described pulverizing device, etc., pulverized cellulose containing a large amount of cellulose fibers having a very short fiber length, in particular, minute cellulose fibers having a fiber length of 0.35 mm or less, can be readily obtained. The pulverized cellulose thus obtained can be formed very fine such that the fiber width is 0.15 μm or less and the number average fiber length is 0.25 mm or less. The absorbing body 2 in accordance with the present invention is obtained by pulverizing cellulose fibers as a raw material with the above-described method to form a fiber assembly containing 45 mass % or more of minute cellulose fibers having a fiber length of 0.35 mm or less, and accommodating the fiber assembly within a spray can 1, and after a lid-like member 4 is disposed on an upper side of the absorbing body 2, a liquefied gas as a propellant is filled to obtain a spray can product.

The lid-like member 4 is composed of a disk-shaped porous body with a constant thickness, which is formed to have a diameter slightly greater than the inside diameter of the spray can 1. The disk-shaped porous body is press fitted within the spray can 1 to closely contact an upper surface of the absorbing body 2 to keep a surface thereof smooth. As a result, the configuration of the absorbing body 2 is held during the filling process or the spraying process of the propellant 3, and the minute cellulose fibers can be prevented from peeling or scattering from the vicinity of the surface thereof. The disk-shaped porous body may be preferably composed of any material provided that it can divide the absorbing body 2 from a space 12 in a gas permeable manner.

For example, the lid-like member 4 can be composed of a non-woven fabric that is a gas permeable fiber assembly. By arbitrarily selecting the material and length of the fibers, the non-woven fabric can be formed comparatively hard into the configuration with a thickness, and by cutting it into a disk-shaped configuration with a predetermined thickness and a predetermined diameter, the disk-shaped porous body can be obtained. Alternatively, by laminating non-woven fabric sheets, each having a predetermined diameter, so as to have a predetermined thickness, the porous body can be also obtained. The non-woven fabric can be preferably composed of any one of synthetic fibers, natural fibers, inorganic fibers, regenerated fibers, etc. The diameter of the lid-like member 4 is made slightly greater than the inside diameter of the trunk section of the spray can 1, while the thickness thereof can be arbitrarily selected from the range between about 5 mm and about 20 mm, for example.

And the lid-like member 4 can be manufactured by foaming a foamable resin such as a foamable urethane resin, a foamable phenol resin, etc. into a configuration with a desired thickness and a desired diameter, or by cutting an obtained foamed body into a desired configuration.

The lid-like member 4 can be also composed of a porous protection layer formed on a surface of the absorbing body 2 integrally therewith. For example, the porous protection layer can be formed so as to closely contact an upper surface of the absorbing body 2 by accommodating the absorbing body 2 within the spray can 1, pouring a raw material for the foam resin from an upper opening to which an ejection opening 11 is to be attached, and foaming the raw material. In this example, the layer of the foamed resin may be arranged to cover the upper surface of the absorbing body 2, and closely contact an inside wall of the spray can 1, thereby holding and securing the absorbing body 2, and the foamed resin layer is not required to have a constant thickness. Therefore, the amount of the resin to be used in the formation of the porous protection layer does not excessively increase, and the time required for the foaming process can be shortened.

The absorbing body 2 and the lid-like member 4 thus arranged do not use any surface sheet nor any bag, and do not use an increased amount of the foam resin so that the material costs can be reduced. In addition, by laminating non-woven fabric sheets on the surface of the absorbing body 2 if compressed, a porous protection layer formed integrally with the absorbing body 2 can be obtained.

Where the present invention is applied to a dust blower, a gas mainly containing dimethyl ether (DME) as a flammable liquefied gas is preferably used as the propellant 3. Dimethyl ether (DME) as the component of the propellant is the simplest ether expressed with the chemical formula of $CH_3OCH_3$, and is a colorless air having a boiling point of −25.1° C. It is chemically stable, and exhibits a low saturated vapor pressure, that is, 0.41 MPa at 20° C., and 0.688 MPa at 35° C. Consequently, upon applying pressure, it is readily liquefied so as to be used by filling the same in a metallic spray can exhibiting a relatively low compression strength without using a container such as a cylinder with a high compression strength.

And, this dimethyl ether (DME) exhibits an ozone depleting potential as small as 0, and a global warming potential as small as 1 or less. When sprayed in the air, the decomposition time in the air is about several tens of hours so as not to cause any greenhouse effect or any depletion of the ozone layer, and consequently, it is useful as the propellant with a smaller environmental impact, as compared with the conventional fluorocarbon gas, HFC 134a, HFC 152a, etc.

The propellant 3 is not limited to dimethyl ether (DME), and any flammable gas, any flame retardant gas, etc. can be preferably used provided that it scarcely causes the depletion of the ozone layer and scarcely affects the global warming. In particular, the gas exhibiting an ozone-depleting potential of 0, and containing no hydro-fluorocarbon can satisfy the "evaluation criteria" in Law on Promoting Green Purchasing so as to be preferable. These gases may not deplete the ozone layer, and the environmental impact is smaller than that of the conventional CFC alternative. Gas such as dimethyl ether (DME) can be used solely, along with other gases, or as a mixture gas with other gas components.

In this case, dimethyl ether (DME) is flammable so that where it is used in the spray can product with the conventional construction as a propellant thereof, flames may be generated, but by absorbing dimethyl ether with the absorbing body 2, and disposing the lid-like member 4 on the surface of the absorbing body 2, the liquid retention is greatly improved. Therefore, only a vaporized gas shifted toward the space 12 via the gas-permeable lid-like member 4 is sprayed from the ejection opening 11 to prevent the leakage of a liquefied gas and reduce the catching of fire. In addition, the absorbing body 2 is stably held within the spray can 1, and consequently, the spray can 1 can be used at any tilting angle so that the spray can product in accordance with the present invention can be used in a tilted or inverted position, and the effect of restraining liquid leakage while used or stored is high so as to enhance safety.

Where the spray can product in accordance with the present invention is applied to a cylinder for use in a torch burner, the basic arrangement is similar to the case of the dust blower, and the absorbing body 2 within the spray can 1 retains a flammable liquefied gas as fuel in place of the propellant 3 of the dust blower. And by supplying fuel to a torch burner having an injection part connected to a head part of the spray can 1, and burning the fuel, various kinds of works using flames are carried out.

A liquefied petroleum gas (LPG) having a high calorific value, and emitting a smaller amount of $CO_2$ in an exhaust gas, as compared with oil and coal, so as not to exhibit the problem of the depletion of the ozone layer, is preferably used as the fuel for the torch burner. Dimethyl ether (DME) and other flammable liquefied gases can be also used as a mixture or solely. In such cases, the absorbing body 2 filled in the spray can 1 and the lid-like member 4 absorb and retain the liquefied gas to prevent liquid leakage so that the safety is greatly improved while the torch burner is used or stored in tilted and inverted positions.

Figure 2:
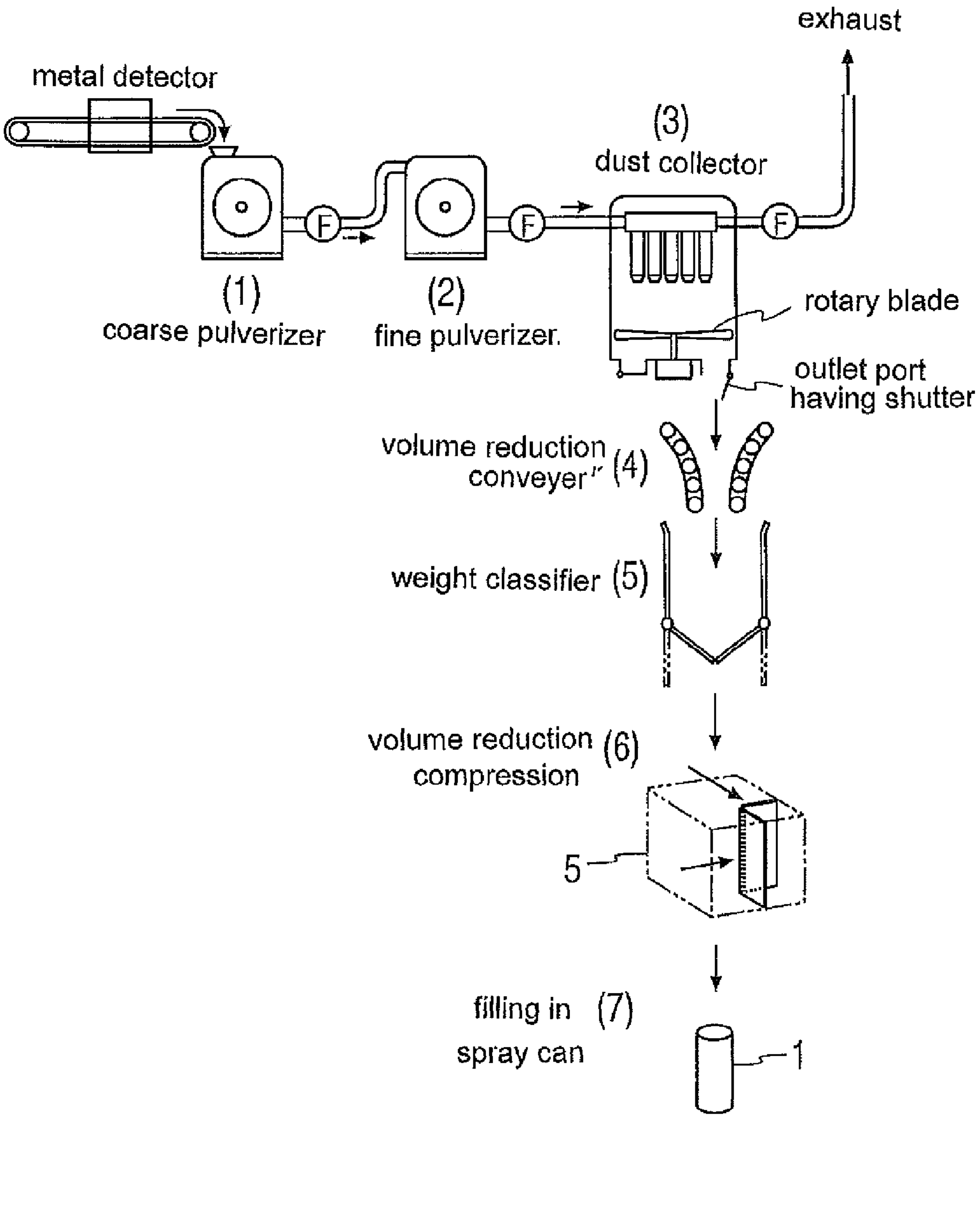
FIG. 2 is a diagram explaining the manufacturing processes of a dust blower to which the present invention is applied.

Hereinafter, a preferred embodiment of the manufacturing method of the spray can product thus constructed will be explained with reference to FIGS. 2 and 3. FIG. 2 illustrates a flow of the manufacturing of the absorbing body 2 by defibrating waste paper, for example, and first, in the pulverizing processes (1) and (2), the waste paper is pulverized to obtain minute cellulose fibers having a fiber length of 0.35 mm or less, for example. In the process (1), waste paper is pulverized using a coarse pulverizer into 20~30 mm square, for example. In the process (2), the pulverized waste paper is further pulverized using a fine pulverizer. At this time, the fiber length of the fibers passing the fine pulverizer depends on the mesh of an outlet screen, and by using the outlet screen with about ϕ3.0~ϕ1.0, pulverized fibers containing desired fine cellulose fibers can be obtained.

Next, in the dust collecting process (3), the fine cellulose fibers are collected. As shown, a dust collector has rotary blades at a bottom thereof, and a screen capable of passing the fine cellulose fibers with a fiber length of 0.35 mm or less within an upper half thereof to supply a compressed air. As a result, the captured fine cellulose fibers are dropped, and can be taken out from outlet ports, each having a shutter, which are respectively provided in four positions of the bottom thereof.

In the process (4), the fine cellulose fibers thus taken are transferred with four volume reduction conveyers, each being connected to each of four outlet ports. The volume reduction conveyer is constructed such that the outlet port side thereof is wide and becomes gradually narrow, thereby slightly compressing a powdered body containing the fine cellulose fibers while conveying the same. The volume reduction conveyers are respectively connected to weight classifiers in the process (5), and the volume-reduced powered body is supplied thereto. The weight classifier is a scale having a shutter, and when a required weight for the spray can product is measured, it opens the shutter to feed a proper amount to the next process.

Then, in the process (6), the weighed prescribed amount of powered body is subjected to volume-reducing and compressing in conformity with the configuration of the spray can, and in the process (7), an obtained fiber assembly is filled in the spray can. These processes (6) and (7) will be explained in detail with reference to FIG. 3.

Figure 3:
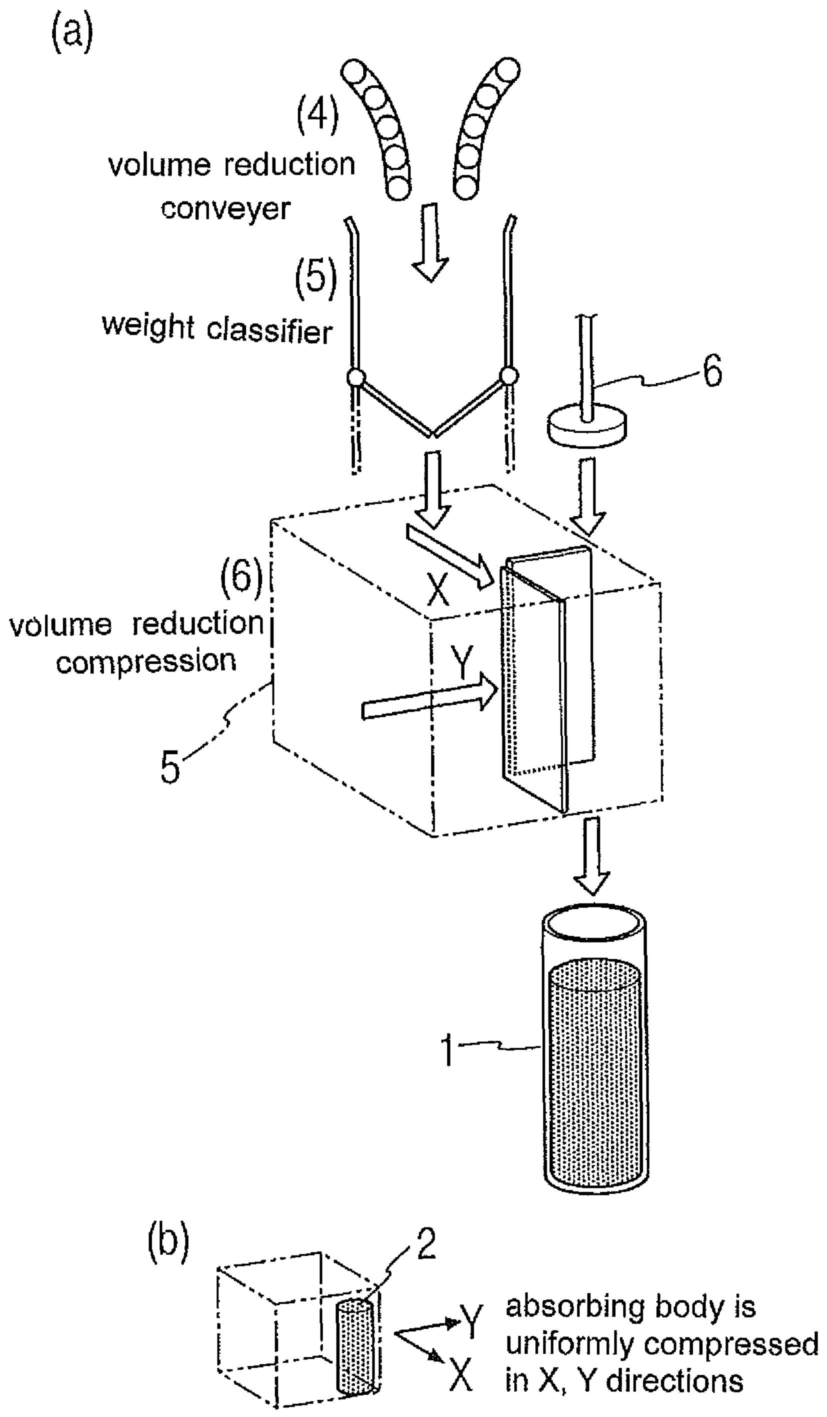
FIG. 3(*a*), (*b*) are diagrams explaining one part of the manufacturing processes of FIG. 2.

As shown in FIG. 3(*a*), the prescribed amount of powdered body weighed with the weight classifier in the process (5) after the process (4) is transferred to a compression container 5 like a generally cubic container in the volume-reducing and compressing process (6), and pressures are applied to compress the weighed powdered body. As shown, the compression container 5 is arranged such that walls thereof can move parallel to each other. And by moving them in the direction x, a primary compression is carried out, and then, by moving them in the direction Y, a secondary compression is carried out, and at the same time, by assembling the compressed powdered body at one corner of the cubic container, a fiber assembly having a generally columnar configuration can be obtained. Furthermore, a bottom of the one corner of the compression container 5 is arranged to open or close with a shutter, for example, and the spray can 1 is disposed under the one corner. With this arrangement, the shutter is opened after the pre-compression is completed, and the fiber assembly is pushed out from the upper side of the spray can 1 with a pushing cylinder 6.

As a result, as shown, biaxially compressed columnar absorbing body 2 is transferred into the downwardly disposed spray can 1. At this time, the pushing cylinder 6 is used to transfer the absorbing body 2 into the spray can 1, and it is preferable to prevent the excessively increasing of the compression in the transferring direction. In this manner, as shown in FIG. 3(*b*), the absorbing body 2 composed of a generally columnar block-shaped compressed body subjected to the uniformly pressing and compressing process in X and Y axial directions is obtained. Where the absorbing body 2 is composed of a pre-compressed body subjected to uniformly pressing and compressing process in X and Y axis directions corresponding to radial directions of the spray can 1, the absorbing body 2 can effectively hold its configuration with directly filled in the spray can 1, whereby the liquid retention is improved. Where the absorbing body 2 is directly filled in the spray can 1, it is not required to compress the absorbing body 2 uniformly in all directions (triaxial compression). Where a pressure is applied in the transferring direction of the pushing cylinder 6 (axial direction of the spray can 1), it may cause cracks between fibers after filling a liquefied gas so as not to be preferable.

In this case, the absorbing body 2 is composed of a block-shaped compressed body subjected to the compressing process in X and Y axis directions, but the absorbing body 2 pre-compressed in radial directions uniformly will do, and the absorbing body 2 can be composed of a columnar block-shaped compressed body subjected to the compressing process radially inwardly of the entire circumference thereof, for example.

Figure 4:
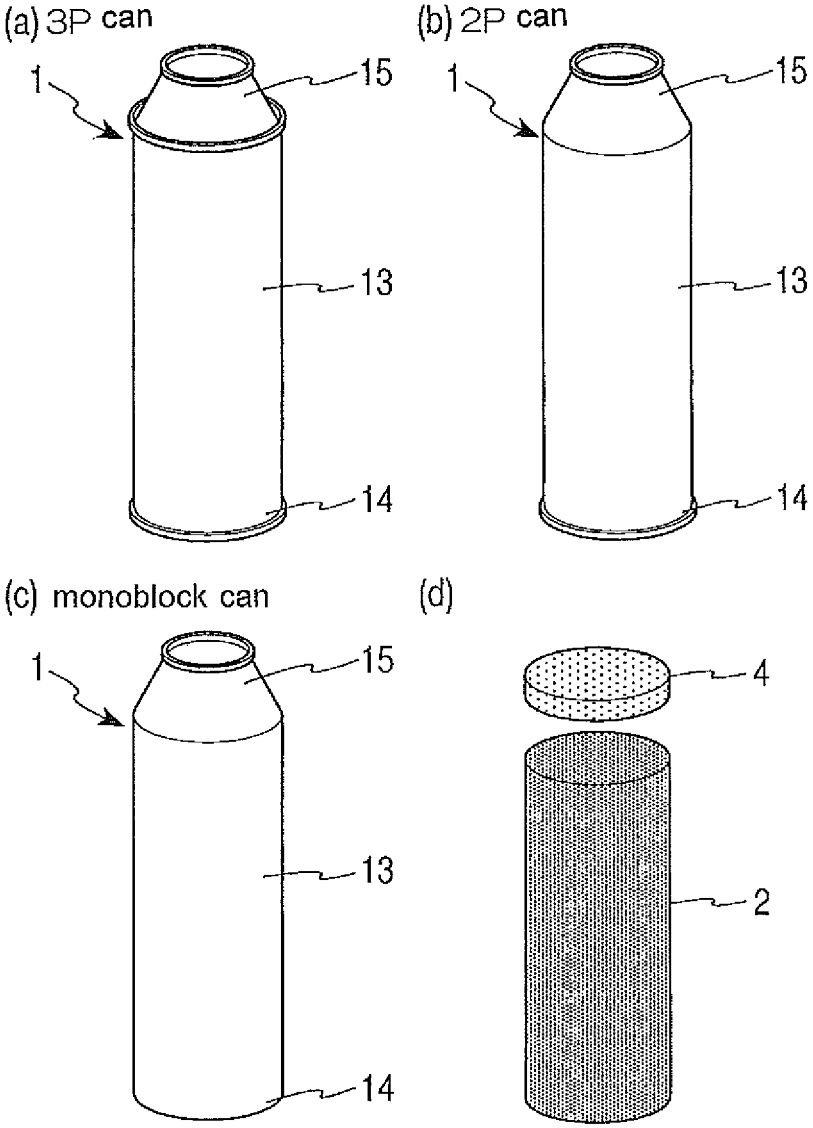
FIG. 4(*a*), (*b*), (*c*) are diagrams explaining the configuration of a spray can used in accordance with the present invention.

By further disposing a lid-like member 4 on an upper surface of the absorbing body 2, a spray can product of the present invention can be obtained. FIG. 4(*a*) through 4(*c*) show various kinds of the spray can 1. FIG. 4(*a*) is a three pieces-can composed of a trunk section 13, a bottom section 14 and a head section 15, which are separately prepared, and by seaming them to each other, an integral body is obtained, FIG. 4(*b*) is a two pieces-can composed of a trunk section 13 and a head section 15, which are integrally prepared, and by seaming a bottom section 14 to the other sections, an integral body is obtained, and FIG. 4(*c*) is a monoblock can integrally composed of a trunk section 13, a bottom section 14 and a head section 15.

In the case of the spray can 1 composed of the three pieces-can shown in FIG. 4(*a*), after the bottom section 14 is seamed, and before the head section 15 is seamed, the bottom of the compression container 5 adapted to accommodate the absorbing body 2 is disposed in close contact with an upper opening of the trunk section 13 coaxially therewith, and the absorbing body 2 is pushed out to fill the spray can 1. In addition, the lid-shaped member 4 composed of a disk-shaped porous body of non-woven fabric, a foam resin, etc. is press-fitted in the spray can 1 into close contact with the surface of the absorbing body 2, and then, by seaming the head section 15, a spray can product wherein the lid-shaped member 4 and the absorbing body 2 are sequentially disposed from the side of the head section 15, as shown in FIG. 4(*d*), is obtained.

In the case of the spray can 1 composed of the two pieces-can shown in FIG. 4(*b*), first, the lid-like member 4 is press-fitted in the head section 15 from the side of the bottom section 14, conversely to the case of the three pieces-can. Then, the compression container 5 adapted to accommodate the absorbing body 2 is disposed in close contact with a lower opening of the trunk section 13 coaxially therewith, and the absorbing body 2 is pushed out to fill the spray can 1. As a result, a spray can product wherein the lid-shaped member 4 and the absorbing body 2 are sequentially disposed from the side of the head section 15, as shown in FIG. 4(*d*), is obtained. And, in the can arrangements shown in FIGS. 4(*a*) and 4(*b*), porous protection layers, each being composed of non-woven fabric, a foam resin, etc. can be laminated on the surface of the absorbing body 2 on the side of the head section 15 prior to pushing process thereof, whereby the absorbing body 2 along with the protection layers are integrally filled in the spray can 1.

Figure 5:
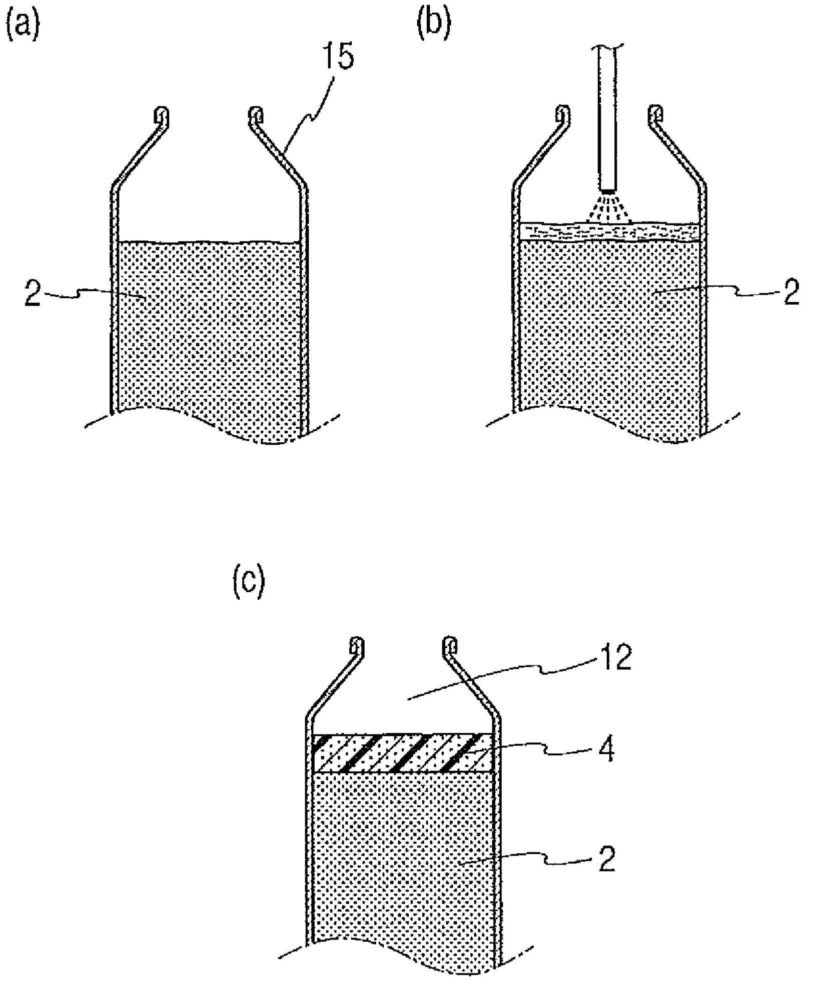
FIG. 5(*a*), (*b*), (*c*) are diagrams explaining the manufacturing method of a lid-like member in accordance with the present invention.

In the case of the monoblock can shown in FIG. 4(*c*), the columnar block-shaped formed body pressed and compressed is repeatedly filled from the opening of the head section 15 such that the outside diameter of the formed body subjected to the biaxial compressing with the compression container 5 in the volume-reducing and compressing process (6) is made identical to the inside diameter of the opening of the head section 15, and consequently, a prescribed weight of the absorbing body 2 can be obtained. Then, as shown in FIG. 5(*a*) and FIG. 5(*b*), the surface of the absorbing body 2 is made generally plane, and a raw material of the foam resin composing the lid-shaped member 4 is filled to uniformly cover the surface of the absorbing body 2, and is made to foam. As a result, as shown in FIG. 5(*c*), the lid-shaped member 4 adapted to protect the surface of the absorbing body 2 is disposed to define a space 12 formed on the upper side thereof. In the can arrangements shown in FIGS. 4(*a*) and 4(*b*), the lid-like member 4 can be also formed using this method.

As described above, in accordance with the method of the present invention, by combining a dry-pulverizing method with a pressing and compressing method, a spray can product can be obtained comparatively readily such that an absorbing body 2 composed of fine cellulose fibers is filled in a spray can, and a lid-like member 4 is provided on an upper surface of the absorbing body 2. This method is good in workability, and is suited to the mass production of the spray can products so as to be excellent in economy and productivity.

EMBODIMENTS

Embodiment 1

Hereinafter, in order to confirm the effects of the present invention, an absorbing body was prepared, and a spray can product was manufactured using the manufacturing processes shown in FIGS. 2 and 3. Waste paper was used as a raw material, in the pulverizing processes (1) and (2), coarse pulverization and fine pulverization were performed to obtain fine pulverized fibers, and in the dust collecting process (3), the fine pulverized fibers were classified and collected, and finely powdered cellulose fibers containing fine cellulose fibers having a fiber length of 0.35 mm or less were piled up. In the processes (4) and (5), the finely powered cellulose fibers taken out from the dust collector were conveyed to a weight classifier via a volume reduction conveyer, and in the process (6), weighed 85 g of a finely powdered cellulose fibers assembly was subjected to the volume reduction compressing, thereby obtaining a columnar block-shaped compressed body.

In the process (7), this columnar block-shaped compressed body was pushed out into the spray can with the configuration shown in FIG. 4(*a*), thereby obtaining an absorbing body. The spray can has an outside diameter of 66 mm and a height of 20 cm, and after the absorbing body is filled in the spray can from an upper end opening of a trunk section thereof in the state where a bottom section and the trunk section are seamed together, a lid-like member previously prepared to have a diameter greater than the inside diameter of the trunk section was press-fitted until contacting an upper surface of the absorbing body. The lid-like member composed of laminated non-woven sheets, each being cut to have a prescribed diameter, was used (diameter: 60 mm, thickness: 10 mm). Then, a head section was seamed on the upper end opening of the trunk section. Upon analyzing the distribution of the fiber length of the cellulose fiber assembly as the absorbing body with a fiber length • shape measuring instrument, the content of the cellulose fibers having a fiber length of 1.5 mm or less was 90 mass % or more, the content of the cellulose fibers having a fiber length of 1.0 mm or less was 80 mass % or more, and the content of the cellulose fibers having a fiber length of 0.35 mm or less was 45 mass % or more.

350 ml of dimethyl ether (DME) that is a flammable liquefied gas was filled in the spray can as a propellant, to prepare a dust blower as the spray can product in accordance with the present invention, and the liquid leakage evaluation test was carried out. Hereinafter, the testing method and the evaluation results will be explained.

<Liquid Leakage Evaluation Test>

After filling a spray can for use in a dust blower with a propellant, and allowing it to stand for a sufficient time, a container was inverted to spray gas. and the time until the liquid leakage occurred in a spray part of the container was measured. As a result, spraying could be continued for 30 seconds or more in an inverted position without any liquid leakage. This result shows that this dust blower exhibits sufficient performance when used for normal dust removing purpose based on the fact that a flammable gas as a propellant of the dust blower, for example, is considered to catch fire because the liquefied gas is not completely evaporated when sprayed, and that one spraying time scarcely exceeds 20 seconds when normally used, and when continuously sprayed for 30 seconds or more, in particular, it is considered difficult to hold the can with bare hands, because of temperature drop due to vaporization heat.

Embodiment 2

Next, an absorbing body was manufactured from LBKP on the market as a raw material, and a spray can product was manufactured with the method similar to that of Embodiment 1. At this time, non-woven sheets, each being cut to have a disk-shaped configuration, which were similarly used in Embodiment 1, were laminated to obtain three kinds of lid-like members, each having a thickness of 8 mm, 10 mm or 15 mm (diameter: 60 mm). When the distribution of the fiber length of the cellulose fiber assembly as the absorbing body is analysed using a fiber length • shape measuring instrument, the content of the cellulose fibers with a fiber length of 1.5 mm or less was 95 mass % or more, the content of the cellulose fibers with a fiber length of 1.0 mm or less was 90 mass % or more, and the content of the cellulose fibers with a fiber length of 0.35 mm or less was 60 mass % or more. After 75 g of the absorbing body and the lid-like member were filled in the spray can, similarly to Embodiment 1, 350 ml of dimethyl ether (DME) that is a flammable liquefied gas was filled in the spray can as a propellant, to prepare a dust blower as the spray can product in accordance with the present invention.

A plurality of samples were prepared from the spray can products manufactured using the lid-like members with different three kinds of thickness, and the liquid leakage evaluation test thereof was carried out (the number of samples N=5). As a result, in the case of the thickness being 8 mm and 10 mm, four out of five samples could continuously spray for 30 seconds or more without any liquid leakage. In the case of the thickness being 15 mm, all of five samples could continuously spray for 30 seconds or more without any liquid leakage.

Therefore, in accordance with the present invention, there can be manufactured a spray can product enabling free selection of the spraying angle, reducing the generation of flame due to liquid leakage when used as a dust blower or a cylinder for use in a torch burner using a flammable gas, and excellent in safety and impression from use, with low production costs.

The invention claimed is:

1. A spray can product manufactured by filling a liquefied gas and an absorbing body for retaining liquid in a spray can having an ejection opening, comprising:

the absorbing body being composed of an assembly of cellulose fibers containing at least 90 mass % of cellulose fibers having a fiber length of 1.5 mm or less, the absorbing body being compressed into a block-shaped configuration corresponding to that of the spray can and being accommodated within the spray can, while defining a space between the election opening and the absorbing body, and a disk-shaped member being provided between the space and the absorbing body protecting a surface of the absorbing body in a gas permeable manner, the disk-shaped member including a disk-shaped porous body adapted to be press-fitted in the spray can into close contact with the surface of the absorbing body.

2. The spray can product as claimed in claim 1, wherein the disk-shaped porous body is composed of one of a non-woven fabric and a foam resin.

3. The spray can product as claimed in claim 1, wherein the absorbing body is prepared by previously forming said assembly of cellulose fibers into a columnar block-shaped compressed body with a configuration corresponding to that of the spray can, and directly filling said columnar block-shaped compressed body in the spray can.

4. The spray can product as claimed in claim 1, wherein the liquefied gas is a flammable liquefied gas.

5. The spray can product as claimed in claim 1, wherein the liquefied gas is composed of a gas exhibiting an ozone-depleting potential of 0, and containing no hydrofluorocarbon.

6. The spray can product as claimed in claim 1, wherein the absorbing body is composed of an assembly of cellulose fibers containing at least 45 mass % of fine cellulose fibers having a fiber length of 0.35 mm or less.

* * * * *